US011143303B2

(12) United States Patent
Bifulco

(10) Patent No.: US 11,143,303 B2
(45) Date of Patent: Oct. 12, 2021

(54) NON-METALLIC ENGINE CASE INLET COMPRESSION SEAL FOR A GAS TURBINE ENGINE

(71) Applicant: United Technologies Corporation, Farmington, CT (US)

(72) Inventor: Anthony R. Bifulco, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 227 days.

(21) Appl. No.: 16/108,758

(22) Filed: Aug. 22, 2018

(65) Prior Publication Data

US 2019/0093492 A1 Mar. 28, 2019

Related U.S. Application Data

(62) Division of application No. 14/948,657, filed on Nov. 23, 2015, now Pat. No. 10,077,669.
(Continued)

(51) Int. Cl.
*F16J 15/02* (2006.01)
*F01D 11/00* (2006.01)
(Continued)

(52) U.S. Cl.
CPC ........... *F16J 15/027* (2013.01); *F01D 11/005* (2013.01); *F02C 7/28* (2013.01); *F16J 15/46* (2013.01); *B64C 7/00* (2013.01); *B64D 29/00* (2013.01); *B64D 33/02* (2013.01); *F01D 11/003* (2013.01); *F02C 7/04* (2013.01); *F02K 1/805* (2013.01); *F05D 2220/32* (2013.01); *F05D 2240/55* (2013.01); *F05D 2250/75* (2013.01); *F05D 2300/437* (2013.01); *F05D 2300/506* (2013.01); *F05D 2300/601* (2013.01); *F16J 15/025* (2013.01); *F16J 15/062* (2013.01); *F16J 15/104* (2013.01)

(58) Field of Classification Search
CPC ..... B64D 33/02; B64D 29/00; F05D 2240/55; F01D 11/005; F02C 7/04; F02C 7/28; F16J 15/027; F16J 15/46; F02K 1/805
See application file for complete search history.

(56) References Cited

U.S. PATENT DOCUMENTS 2,720,011 A * 10/1955 Krupp ................... B64D 15/02
49/477.1
3,178,779 A * 4/1965 Clark ........................ B64C 1/14
277/646
(Continued)

FOREIGN PATENT DOCUMENTS

GB 2385382 A 8/2003

OTHER PUBLICATIONS www.airforcetimes.com/article/20111107/NEWS/111070325/-35-invention-could-save-millions-repairs; Airforce Times; Military Times; $35 invention could save million in repairs; Nov. 7, 2011.

*Primary Examiner* — Nicholas L Foster
(74) *Attorney, Agent, or Firm* — Bachman & LaPointe, P.C.

(57) ABSTRACT

A non-metallic engine case inlet compression seal for a gas turbine engine includes a non-metallic longitudinal leg section that extends from the non-metallic arcuate interface section and a non-metallic mount flange section that extends from the longitudinal leg section.

8 Claims, 6 Drawing Sheets

Related U.S. Application Data

(60) Provisional application No. 62/084,603, filed on Nov. 26, 2014.

(51) Int. Cl.

| | | |
|---|---|---|
| *F02C 7/28* | (2006.01) | |
| *F16J 15/46* | (2006.01) | |
| *F16J 15/06* | (2006.01) | |
| *F16J 15/10* | (2006.01) | |
| *B64D 29/00* | (2006.01) | |
| *B64D 33/02* | (2006.01) | |
| *F02C 7/04* | (2006.01) | |
| *B64C 7/00* | (2006.01) | |
| *F02K 1/80* | (2006.01) | |

(56) References Cited

U.S. PATENT DOCUMENTS

| | | |
|---|---|---|
| 3,591,963 A | 7/1971 | Kopp |
| 4,182,501 A | 1/1980 | Fage |
| 4,453,723 A | 6/1984 | Greenwald |
| 5,199,718 A | 4/1993 | Niemiec |
| 5,220,785 A | 6/1993 | Miller |
| 5,433,070 A | 7/1995 | Amelio |
| 5,704,615 A | 1/1998 | Wheeler |
| 5,706,648 A | 1/1998 | Porte et al. |
| 5,996,936 A | 12/1999 | Mueller |
| 6,050,527 A | 4/2000 | Hebert et al. |
| 6,120,036 A | 9/2000 | Kalsi et al. |
| 6,161,839 A | 12/2000 | Walton et al. |
| 6,299,410 B1 | 10/2001 | Hilbert et al. |
| 6,508,052 B1 | 1/2003 | Snyder et al. |
| 6,557,339 B2 | 5/2003 | Demay et al. |
| 6,581,877 B2 * | 6/2003 | Pauly ..................... B64C 7/00 244/117 R |
| 6,655,635 B2 * | 12/2003 | Maury ..................... F16J 15/027 244/117 R |
| 6,994,144 B2 | 2/2006 | Fletcher |
| 7,086,219 B2 | 8/2006 | Stretton et al. |
| 7,111,705 B2 | 9/2006 | Ohta et al. |
| 7,506,839 B2 | 3/2009 | Conner |
| 7,530,233 B2 | 5/2009 | Milazar |
| 7,966,808 B2 | 6/2011 | Tsou et al. |
| 8,556,214 B2 * | 10/2013 | McAlinden ............... B64C 9/02 244/130 |
| 8,851,416 B2 | 10/2014 | Porte et al. |
| 8,888,445 B2 * | 11/2014 | Pruthi ..................... F01D 9/023 415/174.1 |
| 9,617,783 B2 * | 4/2017 | Yahata ..................... F16J 15/024 |
| 9,618,118 B2 * | 4/2017 | Foster ..................... B64C 3/50 |
| 9,777,838 B2 * | 10/2017 | Yahata ..................... F16J 15/024 |
| 2003/0006344 A1 * | 1/2003 | Pauly ..................... B64C 7/00 244/130 |
| 2003/0066933 A1 * | 4/2003 | Maury ..................... F16J 15/027 244/130 |
| 2004/0182348 A1 | 9/2004 | Sato et al. |
| 2005/0046124 A1 | 3/2005 | Zwolinski et al. |
| 2007/0222163 A1 | 9/2007 | Allford |
| 2009/0166980 A1 | 7/2009 | Miller et al. |
| 2009/0272842 A1 | 11/2009 | Bulin |
| 2010/0109253 A1 | 5/2010 | Keller et al. |
| 2010/0132331 A1 | 6/2010 | Tsou et al. |
| 2011/0024994 A1 | 2/2011 | Bunel |
| 2012/0073304 A1 | 3/2012 | Butkiewicz et al. |
| 2013/0045090 A1 * | 2/2013 | Pruthi ..................... F01D 9/023 415/173.7 |
| 2013/0266448 A1 | 10/2013 | Blin et al. |
| 2014/0051668 A1 | 2/2014 | Cannizzaro et al. |
| 2014/0075948 A1 | 3/2014 | Exner |
| 2014/0345199 A1 * | 11/2014 | Yahata ..................... B64C 1/14 49/475.1 |
| 2015/0226130 A1 | 8/2015 | Salamon et al. |
| 2016/0186866 A1 * | 6/2016 | Foster ..................... F16J 15/027 277/640 |
| 2016/0230580 A1 | 8/2016 | Robertson et al. |
| 2017/0167611 A1 * | 6/2017 | Yahata ..................... F16J 15/027 |

\* cited by examiner

NON-METALLIC ENGINE CASE INLET COMPRESSION SEAL FOR A GAS TURBINE ENGINE

CROSS-REFERENCE TO RELATED APPLICATIONS

This application is a divisional of U.S. patent application Ser. No. 14/948,657, filed Nov. 23, 2015, which claims the benefit of provisional application Ser. No. 62/084,603, filed Nov. 26, 2014.

BACKGROUND

The present disclosure relates to a gas turbine engine and, more particularly, to a non-metallic engine case inlet compression seal therefor.

Gas turbine engines, such as those which power modern military aircraft, include a compressor section to pressurize a supply of air, a combustor section to burn a hydrocarbon fuel in the presence of the pressurized air, and a turbine section to extract energy from the resultant combustion gases and generate thrust. Downstream of the turbine section, an augmentor section, or "afterburner", is operable to selectively increase thrust. The increase in thrust is produced when fuel is injected into the core gases downstream of the turbine section and burned with the oxygen contained therein to generate a second combustion that is then passed through a variable area nozzle system.

In gas turbine powered aircraft, especially military aircraft, location of the gas turbine engine within the airframe reduces drag and signature. The internal engine location, however, necessarily requires airflow to be routed through an intake duct in the airframe to the engine. The intake duct is typically integrated with the airframe and interfaces with the engine case inlet via a compression seal interface to effectively communicate airflow to the engine. The compression seal interface often includes a K-seal mounted to the airframe and a J-seal mounted to the engine. Typically, the K-seal is non-metallic and the J-seal are manufactured of a titanium material. Although effective, the J-seal may be relatively difficult to manufacture and may be susceptible to cycle fatigue.

SUMMARY

A non-metallic engine case inlet compression seal for a gas turbine engine, according to one disclosed non-limiting embodiment of the present disclosure includes a non-metallic arcuate interface section; a non-metallic longitudinal leg section that extends from the non-metallic arcuate interface section; and a non-metallic mount flange section that extends from the longitudinal leg section.

A further embodiment of the present disclosure includes, wherein the non-metallic arcuate interface section has a durometer different than that of the non-metallic longitudinal leg section.

A further embodiment of any of the foregoing embodiments of the present disclosure includes, wherein the non-metallic arcuate interface section has a durometer different than that of the non-metallic mount flange section.

A further embodiment of any of the foregoing embodiments of the present disclosure includes, wherein the non-metallic longitudinal leg section has a durometer different than that of the of the non-metallic mount flange section.

A further embodiment of any of the foregoing embodiments of the present disclosure includes, wherein each of the non-metallic arcuate interface section, the non-metallic longitudinal leg section, and the non-metallic mount flange section have a different durometer.

A further embodiment of any of the foregoing embodiments of the present disclosure includes, wherein each of the non-metallic arcuate interface section, the non-metallic longitudinal leg section, and the non-metallic mount flange section are integral.

A further embodiment of any of the foregoing embodiments of the present disclosure includes, wherein each of the non-metallic arcuate interface section, the non-metallic longitudinal leg section, and the non-metallic mount flange section are integral.

A further embodiment of any of the foregoing embodiments of the present disclosure includes, wherein each of the non-metallic arcuate interface section, the non-metallic longitudinal leg section, and the non-metallic mount flange section are manufactured of a silicone rubber.

A further embodiment of any of the foregoing embodiments of the present disclosure includes, wherein the non-metallic arcuate interface section, the non-metallic longitudinal leg section, and the non-metallic mount flange section form a circular "J" seal.

A further embodiment of any of the foregoing embodiments of the present disclosure includes, wherein the non-metallic mount flange has a multiple of apertures.

A further embodiment of any of the foregoing embodiments of the present disclosure includes, wherein at least one of the non-metallic arcuate interface section, the non-metallic longitudinal leg section, and the non-metallic mount flange section includes fiber reinforcement.

A further embodiment of any of the foregoing embodiments of the present disclosure includes, wherein the fiber reinforcement includes an aramid material.

A further embodiment of any of the foregoing embodiments of the present disclosure includes, a fiber reinforcement that impregnates at least one of the non-metallic arcuate interface section, the non-metallic longitudinal leg section, and the non-metallic mount flange section.

A further embodiment of any of the foregoing embodiments of the present disclosure includes, a fiber reinforcement bonded to an outer surface of at least one of the non-metallic arcuate interface section, the non-metallic longitudinal leg section, and the non-metallic mount flange section.

A further embodiment of any of the foregoing embodiments of the present disclosure includes, wherein the non-metallic arcuate interface section forms a bulb.

A further embodiment of any of the foregoing embodiments of the present disclosure includes, an interface to the bulb to receive air to pressurize the bulb.

A non-metallic engine case inlet compression seal for a gas turbine engine, according to another disclosed non-limiting embodiment of the present disclosure includes an non-metallic arcuate interface section, the non-metallic arcuate interface section forms a bulb; and an interface to the bulb to receive and air to pressurize the bulb.

A further embodiment of any of the foregoing embodiments of the present disclosure includes, a non-metallic longitudinal leg section that extends from the non-metallic arcuate interface section.

A further embodiment of any of the foregoing embodiments of the present disclosure includes a non-metallic mount flange section that extends from the longitudinal leg section.

A further embodiment of any of the foregoing embodiments of the present disclosure includes, wherein each of the non-metallic arcuate interface section, the non-metallic longitudinal leg section, and the non-metallic mount flange section are manufactured of a silicone rubber.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
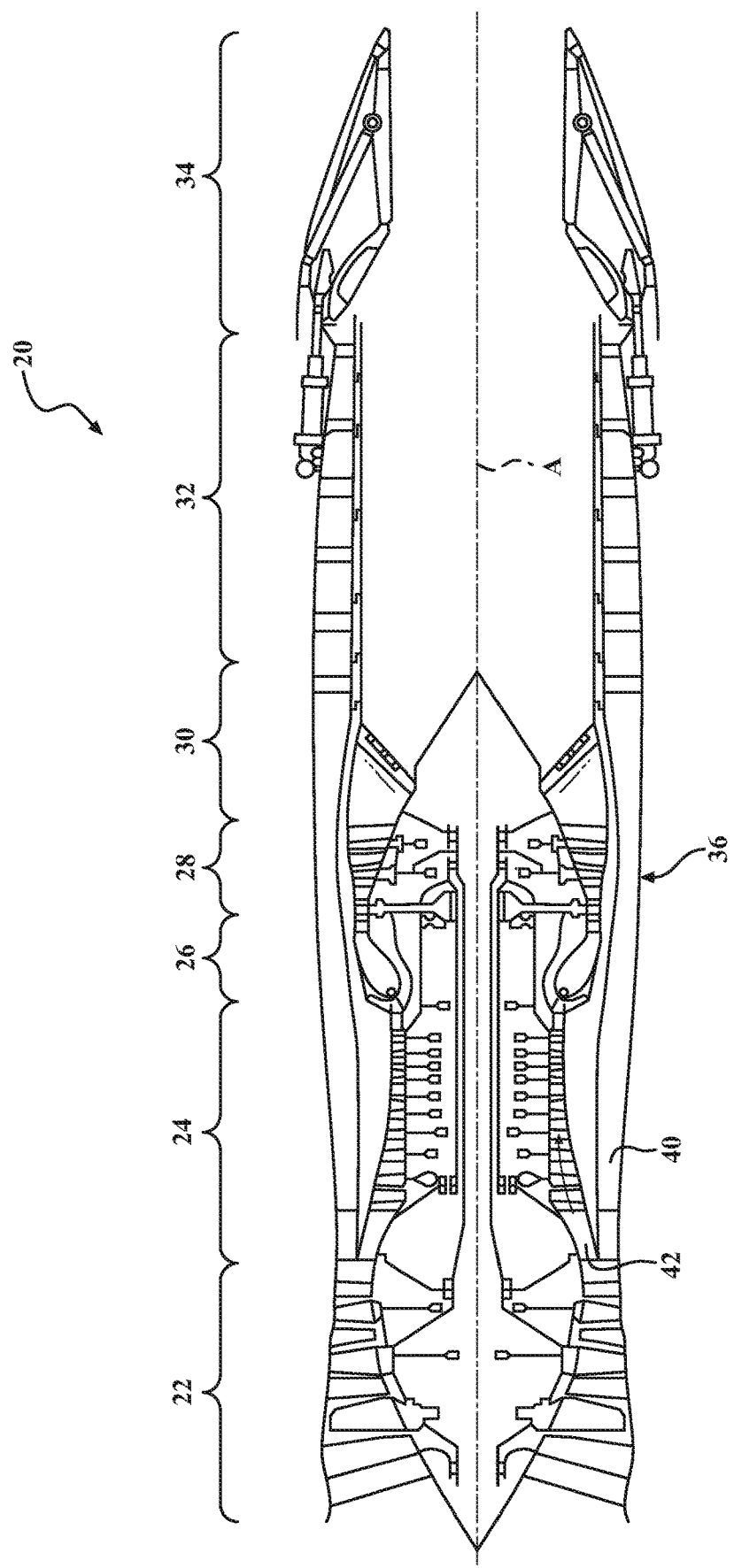
FIG. 1 is a general schematic view of an example gas turbine engine with a nozzle section according to one disclosed non-limiting embodiment.

FIG. 1 schematically illustrates a gas turbine engine 20. The gas turbine engine 20 is disclosed herein as a two-spool, low-bypass, augmented turbofan that generally incorporates a fan section 22, a compressor section 24, a combustor section 26, a turbine section 28, an augmenter section 30, a duct section 32, and a non-metallic engine case inlet compression seal 34 along a central longitudinal engine axis A. Although depicted as an augmented low bypass turbofan in the disclosed non-limiting embodiment, it should be appreciated that the concepts described herein are applicable to other gas turbine engines including non-augmented engines, geared architecture engines, direct drive turbofans, turbojet, turboshaft, multi-stream variable cycle, and other engine architectures with a nozzle system.

An outer case structure 36 and an inner case structure 38 define a generally annular secondary airflow path 40 around a core airflow path 42. Various structures and modules may define the outer case structure 36 and the inner case structure 38 which essentially define an exoskeleton to support rotational hardware therein. Air that enters the fan section 22 is divided between core airflow through the core airflow path 42, and secondary airflow through the secondary airflow path 40. The core airflow passes through the combustor section 26, the turbine section 28, then the augmentor section 30, where fuel may be selectively injected and burned to generate additional thrust through the non-metallic engine case inlet compression seal 34.

The secondary airflow may be utilized for a multiple of purposes to include, for example, cooling, pressurization and variable cycle operations. The secondary airflow as defined herein is any airflow different from the core airflow. The secondary airflow may ultimately be at least partially injected into the core airflow path 42 adjacent to the duct section 32 and the non-metallic engine case inlet compression seal 34. It should be appreciated that additional airflow streams, such as third stream airflow typical of variable cycle engine architectures, may additionally be provided.

Figure 2:
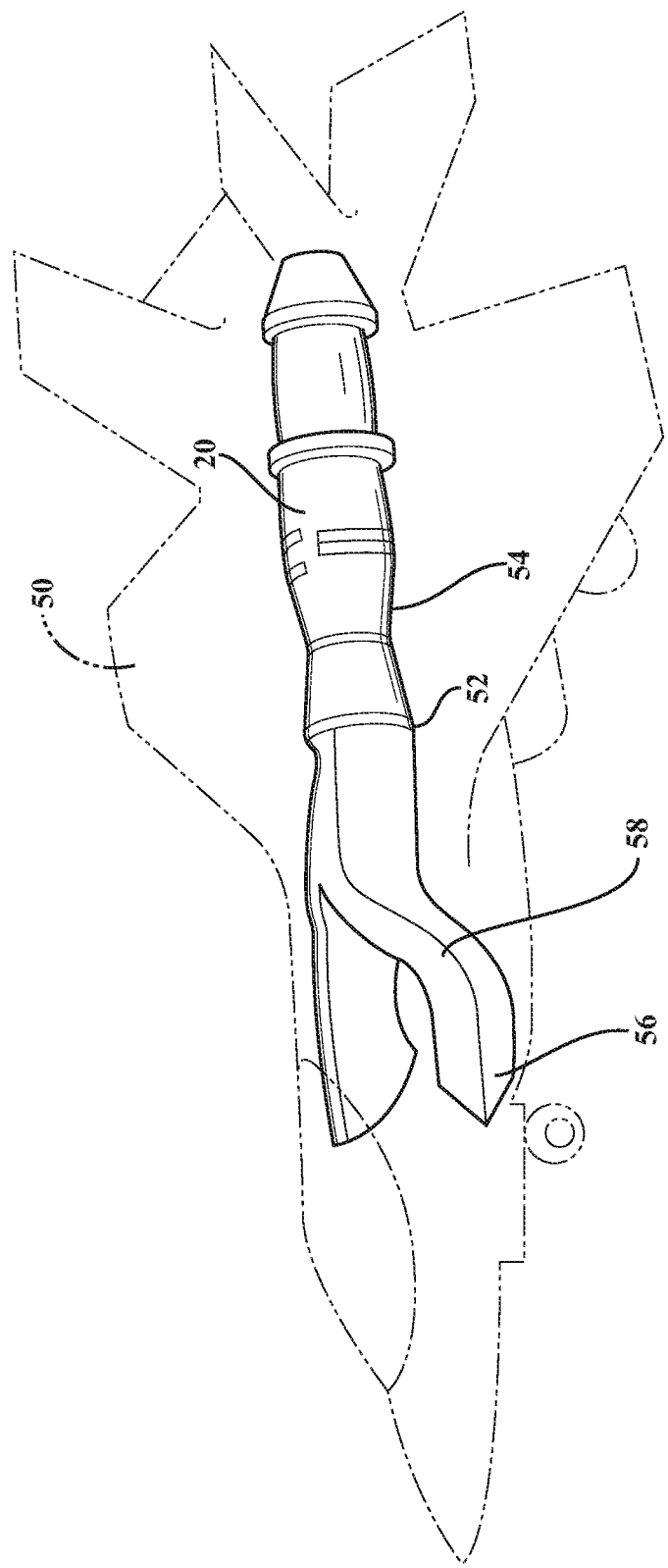
FIG. 2 is a phantom view of an airframe illustrating a non-metallic engine case inlet compression seal between an aircraft intake duct and an engine case inlet of the gas turbine engine.

With reference to FIG. 2, the engine 20 is removably located within an airframe 50 (illustrated schematically). It should be appreciated that various airframe 50 configurations will benefit herefrom. The airframe 50 generally includes an engine bulkhead 52, an engine bay 54, an inlet 56, and an intake duct 58. The intake duct 58 is integrated within, or forms a portion of, the airframe 50. The bulkhead 52 is located generally between the intake duct 58 and the engine bay 54.

Figure 3:
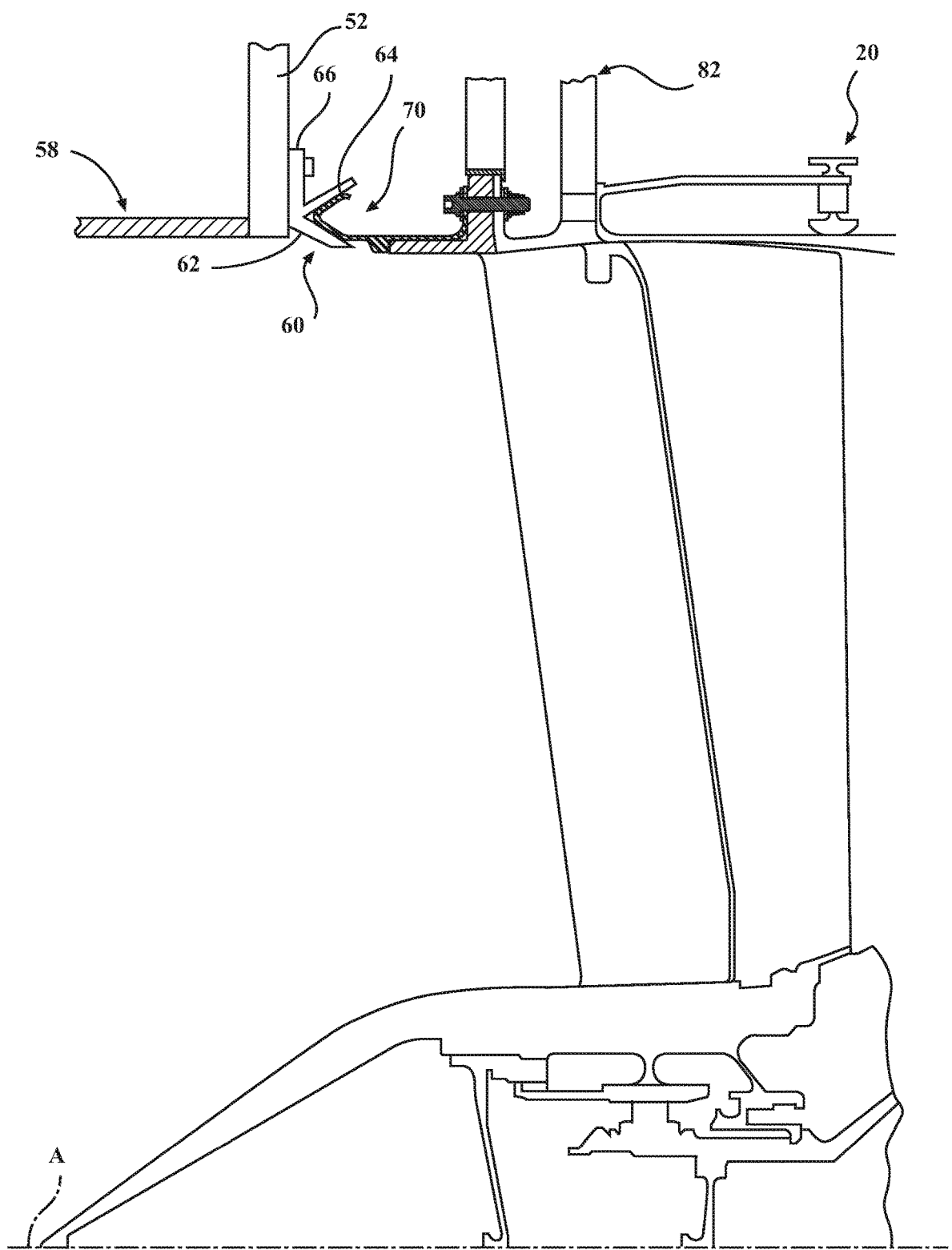
FIG. 3 is an exposed sectional of the non-metallic engine case inlet compression seal mounted to an engine case.
Figure 4:
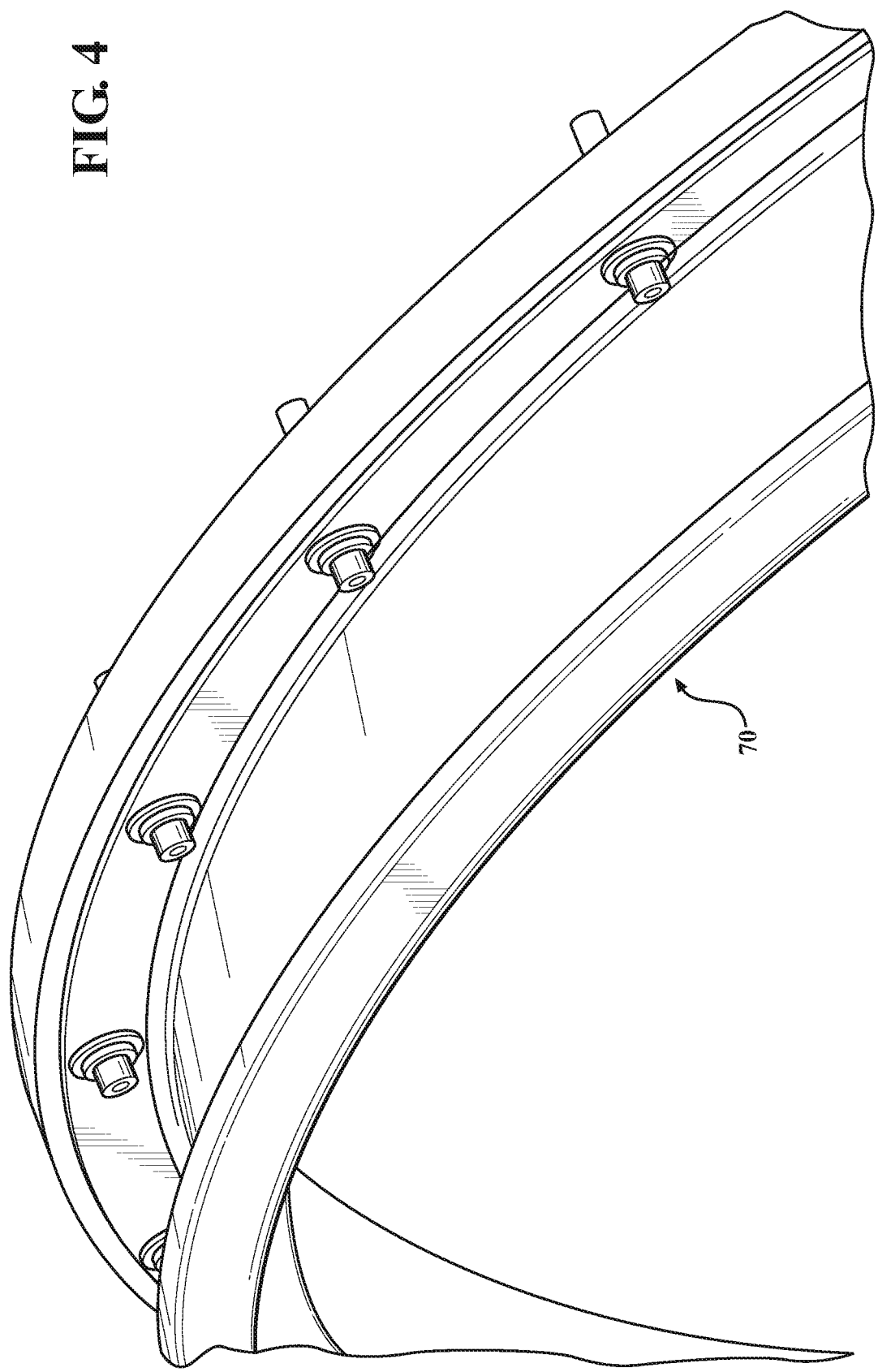
FIG. 4 is a partial perspective view of the non-metallic engine case inlet compression seal according to one disclosed non-limiting embodiment.

With reference to FIG. 3, the engine 20, which is situated in the engine bay 54, is coupled to the intake duct 58 by a compression interface formed by a bulkhead seal 60 and a non-metallic engine case inlet compression seal 70 (FIG. 4). The bulkhead seal 60, such as a K-seal, is mounted to the bulkhead 52. The non-metallic engine case inlet compression seal 70, such as J-seal, is mounted to the outer case structure 36. Thus, the engine 20 is sealed with the intake duct 58 through the compression interface formed by the J-seal and the K-seal such that air is routed from the inlet 56 to the engine 20. For clarity, only a circumferential portion of the non-metallic engine case inlet compression seal 70 and the bulkhead seal 60 are shown. Normally, the non-metallic engine case inlet compression seal 70 and the bulkhead seal 60 entail full 360° rings, of either a single piece or ring segments.

The bulkhead seal 60 generally includes an inner leg 62, an outer leg 64, and a mount flange 66. The inner leg 62 and the outer leg 64 form a V-shape open toward a forward edge 86 of the outer case structure 36 to at least partially receive the non-metallic engine case inlet compression seal 70 therebetween. The mount flange 66 permits attachment of the bulkhead seal 60 to the engine bulkhead 52. The bulkhead seal 60 is typically manufactured of an alloy such as titanium. It should be appreciated that various configurations may be provided.

Figure 5:
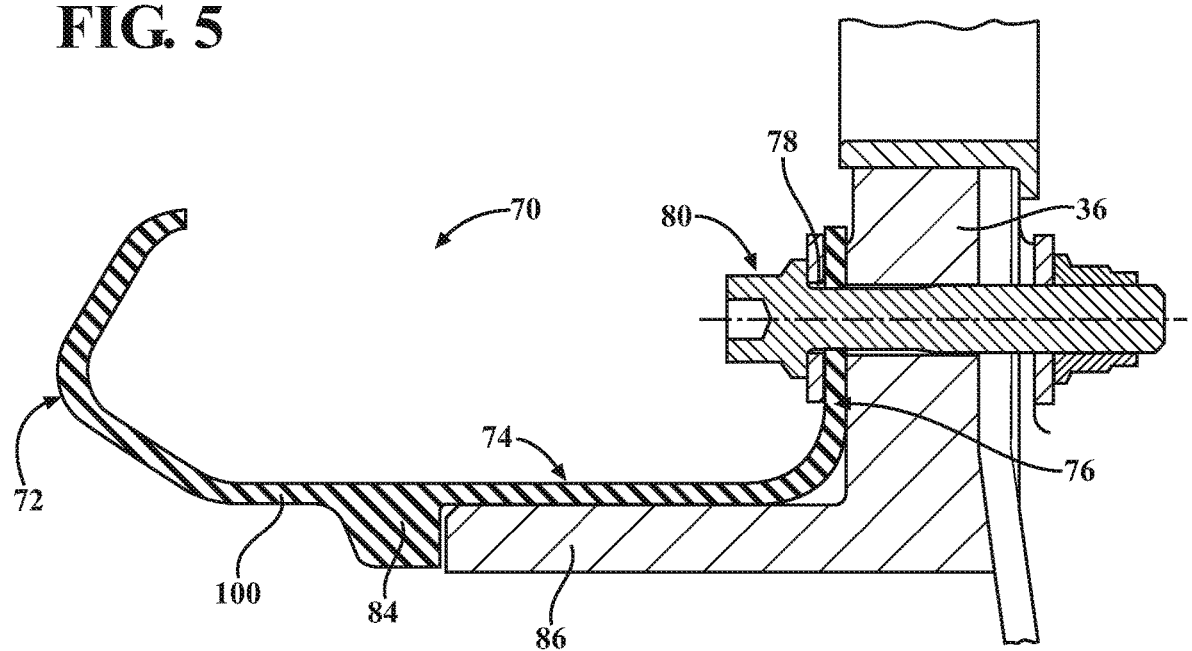
FIG. 5 is a sectional view of the non-metallic engine case inlet compression seal according to one disclosed non-limiting embodiment.

With reference to FIG. 5, the non-metallic engine case inlet compression seal 70 generally includes a non-metallic arcuate interface section 72, a non-metallic longitudinal leg section 74, and a non-metallic mount flange section 76. The non-metallic arcuate interface section 72 extends from the non-metallic longitudinal leg section 74 to, in this example, form a generally "J" shape. The non-metallic mount flange section 76 extends transversely from the non-metallic longitudinal leg section 74 and includes a multiple of apertures 78. Each of the apertures 78 receives a fastener 80 to mount the non-metallic engine case inlet compression seal 70 to the outer case structure 36 forward of the fan section 22. In this embodiment, the non-metallic engine case inlet compression seal 70 extends from the outer case structure 36 from the forward circumferential edge of the fan section 22 forward of an engine mount 82 (FIG. 3).

Figure 6:
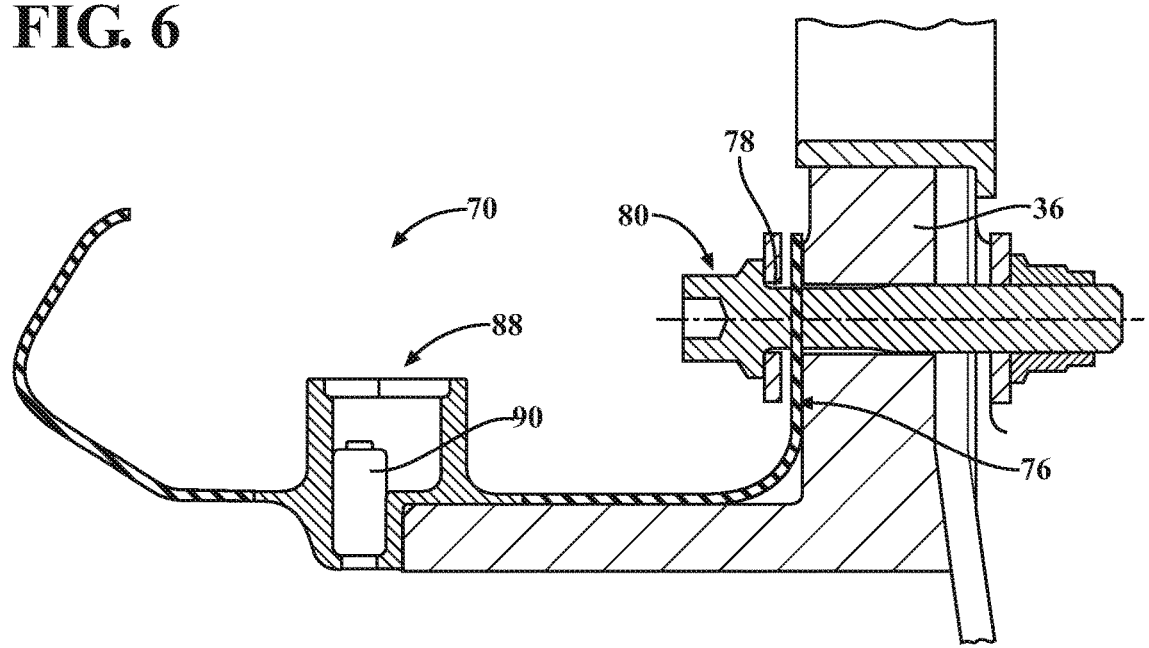
FIG. 6 is a sectional view of the non-metallic engine case inlet compression seal according to one disclosed non-limiting embodiment.

The non-metallic longitudinal leg section 74 may include a stepped surface 84 that abuts the forward edge 86 of the outer case structure 36. Alternatively, the non-metallic longitudinal leg section 74 may form an aperture 88 (FIG. 6) at least partially through the stepped surface 84 to receive a sensor 90 (illustrated schematically) such as a pressure sensor therein. The aperture 88, in this example, is continuous with the stepped surface 84.

The non-metallic engine case inlet compression seal 70 is manufactured of a non-metallic material 100 such as silicone rubber formed, or extruded, to shape. It should be appreciated that various non-metallic materials may be utilized. The cross section and stiffness of the non-metallic engine case inlet compression seal 70 is arranged to seal the interface irrespective of relative motion between the airframe 50 and the engine 20 such as is typical during maneuvering flight.

Figure 7:
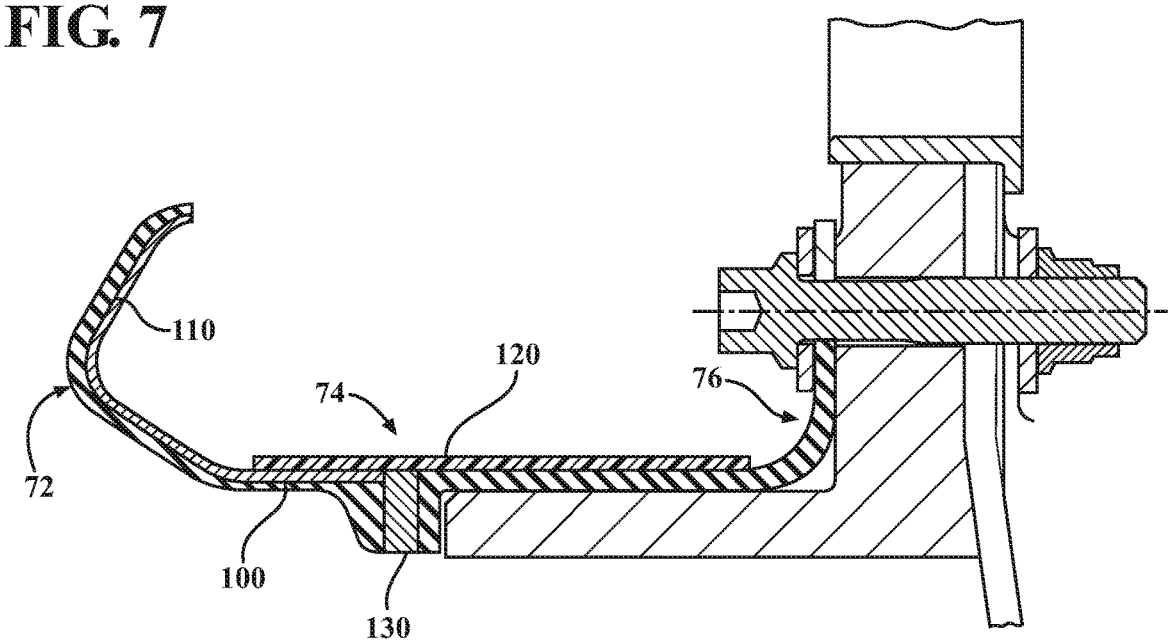
FIG. 7 is a sectional view of the non-metallic engine case inlet compression seal according to one disclosed non-limiting embodiment.

With reference to FIG. 7, in another disclosed non-limiting embodiment, the material 100 may include fiber reinforcement 110 with, for example, meta-aramid material fibers. The fiber reinforcement 110 may be utilized to impregnate the non-metallic engine case inlet compression seal 70 to provide strength and stiffness, alternatively, or in addition thereto, fiber reinforcement 120 may, be bonded to the outer surfaces of the non-metallic engine case inlet compression seal 70 to provide strength and durability. In one example, the fiber reinforcement 110 may be located to directly contact upon the bulkhead seal 60 for strength, reduced friction, etc. In another example, the fiber reinforcement 110 may be located as reinforcement for strength or increased bond strength. It should be appreciated that beyond mechanical retention of fasteners the non-metallic engine case inlet compression seal 70 may also be retained via bonding. The material 100 may further include various coatings to, for example, increase lubricity, heat resistance, etc.

In another disclosed non-limiting embodiment, one or more of the non-metallic arcuate interface section 72, the non-metallic longitudinal leg section 74, and the non-metallic mount flange section 76, may be manufactured of different non-metallic materials. In one example, the non-metallic mount flange section 76 may be manufactured of a material that has a relatively higher durometer than that of the non-metallic arcuate interface section 72, yet be integrated thereto such as via co-molding, over-molding, or other such manufacturing process. In another disclosed non-limiting embodiment, the non-metallic longitudinal leg section 74 may be manufactured of a relatively rigid non-metallic material, or include an insert 130 thereof.

Figure 8:
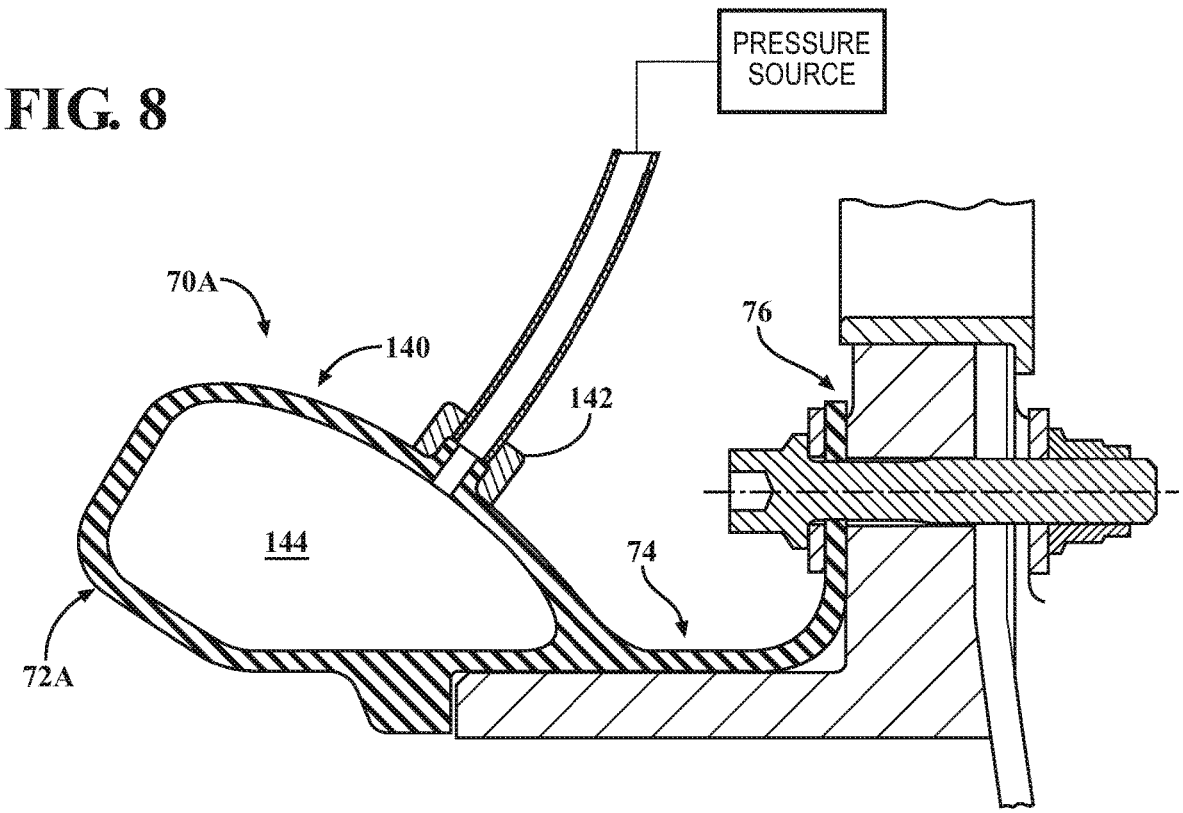
FIG. 8 is a sectional view of the non-metallic engine case inlet compression seal according to one disclosed non-limiting embodiment.

With reference to FIG. 8, in another disclosed non-limiting embodiment, an non-metallic engine case inlet compression seal 70A may include a non-metallic arcuate interface section 72A that forms a bulb 140. The bulb 140 may include an interface 142 to receive air from an air pressure source to pressurize a pressurization region 144 formed by the bulb 140. The air pressure source, for example, may be secondary airflow sourced from the secondary airflow path 40 (FIG. 1). The bulb 140 is thereby pressurized to facilitate formation of a conforming compression seal that readily provide an increased contact surface with the bulkhead seal 60. That is, the pressurization region 144 thereby drives the bulb 140 into the bulkhead seal 60 to increase contact therewith.

The non-metallic engine case inlet compression seal is relatively uncomplicated to manufacture yet provides for relatively complex geometries that may include one or more pressurized regions. The non-metallic material also provides for considerable design options such as shape, durometer, coatings, reinforcement, and/or pressurization. The non-metallic engine case inlet compression seal readily tolerates application temperatures and provides flexibility of design for unique properties at various sections such as rigid and stiff at fastening location, flexible and resilient at a seal interface, and/or rigid where pressure sensors or other features may be installed. The non-metallic engine case inlet compression seal is also relatively insensitive to shipping and handling conditions. The non-metallic engine case inlet compression seal also avoids the necessity of metallic seal stop crack drilling may be readily mended.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A sealing assembly for a gas turbine engine, comprising:
   an outer case structure of the gas turbine engine;
   a non-metallic longitudinal leg section that comprises a stepped surface that abuts a forward edge of the outer case structure of the gas turbine engine;
   non-metallic arcuate interface section that extends from said non-metallic longitudinal leg section, said non-metallic arcuate interface section forms a bulb; and
   an interface to said bulb to receive air sourced from a secondary airflow path of the gas turbine engine to pressurize a pressurization region formed by said bulb such that the pressurization region formed by said bulb is cantilevered from the forward edge of the outer case structure of the gas turbine engine defined along an engine longitudinal axis of the gas turbine engine to extend generally axially with respect to the engine longitudinal axis.

2. The sealing assembly as recited in claim 1, wherein the non-metallic longitudinal leg section that extends from said non-metallic arcuate interface section.

3. The sealing assembly as recited in claim 2, further comprising a non-metallic mount flange section that extends from said longitudinal leg section.

4. The sealing assembly as recited in claim 3, wherein each of said non-metallic arcuate interface section, said non-metallic longitudinal leg section, and said non-metallic mount flange section are manufactured of a silicone rubber.

5. The sealing assembly as recited in claim 1, wherein the non-metallic arcuate interface section is for interfacing with a bulkhead seal on an airframe bulkhead of the gas turbine engine, the bulkhead seal comprises an inner leg, an outer leg, and a mount flange, the inner leg, and the outer leg forms a V-shape.

6. The sealing assembly as recited in claim 1, wherein the non-metallic longitudinal leg section adjacent to the non-metallic arcuate interface section.

7. The sealing assembly as recited in claim 1, further comprising a non-metallic mount flange section that extends transversely from the non-metallic longitudinal leg section.

8. The sealing assembly as recited in claim 7, wherein the non-metallic mount flange section comprises a multiple of apertures.

\* \* \* \* \*